US005193782A

United States Patent [19]

Bailey

[11] Patent Number: 5,193,782

[45] Date of Patent: Mar. 16, 1993

[54] EJECTOR FOR SORTING MACHINE

[75] Inventor: Roger F. Bailey, Sugar Land, Tex.

[73] Assignee: Delta Technology Corporation, Houston, Tex.

[21] Appl. No.: 672,964

[22] Filed: Mar. 21, 1991

[51] Int. Cl.[5] .................... F16K 31/06

[52] U.S. Cl. .................... 251/129.21; 251/129.22; 251/129.16; 251/155

[58] Field of Search .................... 251/129.21, 129.22, 251/129.16, 155

[56] References Cited

U.S. PATENT DOCUMENTS

| | | | |
|---|---|---|---|
| 3,028,960 | 4/1962 | Currie et al. . | |
| 3,053,497 | 9/1962 | Fraenkel . | |
| 3,097,744 | 7/1963 | Hutter et al. . | |
| 3,216,567 | 11/1965 | Kelly et al. . | |
| 3,380,586 | 4/1968 | Frobese et al. . | |
| 3,738,484 | 6/1973 | Hoover et al. . | |
| 3,782,544 | 1/1974 | Perkins, III . | |
| 3,914,601 | 10/1975 | Hoover et al. . | |
| 4,057,146 | 11/1977 | Castaneda et al. . | |
| 4,074,808 | 2/1978 | Gillespie et al. . | |
| 4,099,620 | 7/1978 | Kendall et al. . | |
| 4,252,240 | 2/1981 | Satake . | |
| 4,356,980 | 11/1982 | Krauss | 251/129.21 X |
| 4,454,029 | 6/1984 | Codding . | |
| 4,513,868 | 4/1985 | Culling et al. . | |
| 4,697,709 | 10/1987 | Codding . | |
| 4,699,274 | 10/1987 | Saika . | |
| 4,883,252 | 11/1989 | Mesenich | 251/129.22 X |
| 5,054,691 | 10/1991 | Huang et al. | 251/129.21 X |

FOREIGN PATENT DOCUMENTS

| | | | |
|---|---|---|---|
| 1291765 | 10/1972 | United Kingdom | 251/129.22 |

OTHER PUBLICATIONS

"DSB-201 Bichromatic Color Sorter" Delta Technology Corp. (assignee of the invention described in this app.), 1983.

"Model DSX-404 Multichannel Ratiometric/Bichromatic Color Sorter," Delta Technology Corp., 1986.

"Models DSR-114 and DSR-214 Color Sorters," Delta Technology Corp., 1986.

"Model DSM-HRS Monochromatic Scanner," Delta Technology Corp., 1986.

"Model DSRM-600 Superscan," Delta Technology Corp., 1987.

*Primary Examiner*—Arnold Rosenthal

*Attorney, Agent, or Firm*—Pravel, Gambrell, Hewitt, Kimball & Krieger

[57] ABSTRACT

An ejector for an objector product sorter is disclosed which, in one embodiment, has a solenoid with a coil having a hollow center through which air flows and, in one aspect, has a relatively small air reservoir space to increase ejector accuracy. In one embodiment, balanced air flow provides for uniform travel of a valve seat cover, further increasing accuracy and efficiency.

12 Claims, 2 Drawing Sheets

EJECTOR FOR SORTING MACHINE

BACKGROUND OF THE INVENTION

1. Field of the Invention

The present invention relates to an ejector valve for a product sorter.

2. Description of Prior Art

Certain product sorters use an ejector to separate the unacceptable product (objects) from that which is acceptable. A stream of product such as diamonds, coffee beans, grain or peanuts passes by the nozzle of the ejector, usually one at a time. If the product is acceptable, individual ones of the product pass by the ejector unhindered. If individual ones of the product are unacceptable, the ejector discharges a burst of air which alters the path of the unacceptable product, thereby rejecting them. Conversely a desired product may be ejected while undesired product flows unhindered. The ejector apparatus includes a pressurized chamber, a nozzle and a solenoid valve separating the pressurized chamber from the nozzle.

Valves of the prior art contain a movable disk or a valve flap made of a flexible material fastened at one end. When the solenoid is not activated, the flexible flap rests against a valve seal, thereby blocking an aperture between the high pressure chamber and the nozzle. In closed position air is not communicated from the pressurized chamber into the nozzle, and acceptable product is allowed to pass by the nozzle unhindered.

When the solenoid is activated, the unfastened end of the flexible flap is magnetically pulled off the valve seal, allowing air to flow from the high pressure chamber through the aperture and through the nozzle. In this open position, air flowing out of the nozzle blows any unacceptable product passing in front of the nozzle to divert its path. The solenoid is then deactivated to reclose the valve so that acceptable product again passes by the ejector nozzle unhindered. The valve typically opens and closes quickly during product sorting, flexing the valve flap each time. The valve flap may eventually wear out and break, shutting down the entire sorter until the ejector is replaced or repaired.

In another prior art mechanism a disk which is not fastened, but is constrained, to slide between open and closed positions. The valve is closed when the solenoid is not activated and the valve disc rests upon the valve seat which blocks the aperture between the high pressure chamber and the nozzle. Air does not flow out of the nozzle when the valve is closed so that acceptable product passing in front of the nozzle falls unhindered. The valve is open when the solenoid is activated so that the valve disc slides towards the solenoid and away from the valve seat, allowing air to flow from the pressurized chamber through the valve aperture and through the nozzle to reject the product. The solenoid valve is then deactivated so that the valve disc slides back onto the seal thereby blocking the aperture and re-closing the valve. In prior art solenoid valves in which air is injected to one side of the solenoid, the resulting uneven air flow and distribution can cause a valve disc to move in its chamber in an inclined, non-parallel manner.

The activation current through the coil of the solenoid causes the coil to heat up during operation. In certain prior art valves, the coil is located within the air chamber so that the air flows around the coil to keep it cool. The air flow around the coil is often insufficient to cool it and often cools only a part of the coil. In certain prior art devices a cushion is disposed at one end of the solenoid so that the solenoid is held tight against part of the valve seat body. This cushion prevents air from flowing through the solenoid coil. The space around the coil that holds the cooling air also serves as an air reservoir that must be filled with air under pressure prior to the exit of air from the solenoid. This reservoir coupled with another air holding space beneath the disk creates a relatively large air volume that must be traversed by the pressurized air that is to knock out an unwanted object. Due to the relatively large volume, an undesirable amount of time is required for a knock-out air burst. Such an extended burst may eject a desired object as well as others that were not intended to be ejected.

With both the prior art flap valves and disk valves, uneven air flow and/or uneven flap or disc movement can require more time to eject a particular object.

Typical prior art sorting machines are shown in U.S. Pat. Nos. 3,028,960; 3,914,601; 4,057,146; 4,699,274; 4,513,868; 4,697,709 and 4,454,029 (both commonly owned With the present invention); and U.K. patent application 2,136,957A.

SUMMARY OF THE PRESENT INVENTION

The present invention, in one embodiment, is directed to a new sorter ejector which has a solenoid coil through which cooling air flows. The ejector body is configured to minimize the space around the coil and to provide for the flow of cooling air through the coil. In one embodiment this is accomplished by providing a cushion for the solenoid which does not shut off air flow through the middle of the solenoid coil.

In one embodiment of a new ejector according to the present invention in which air flows through the middle of the solenoid's coil and an amount of air flows around the coil, balanced air flow to the disc results in parallel or nearly parallel even travel of the disc away from its seat.

With these improvements, the valve need not be open for as long as prior art valves must be open to deliver a sufficient air burst to eject an object. Also, with these improvements, a shorter more distinct air burst is possible, an air burst which affects only the object to be ejected and not adjacent objects in the flow which are not to be ejected.

A valve apparatus for an ejector for an object sorter according to this invention in one embodiment has an inlet member with an inlet to receive pressurized gas and an outlet for transfer of the gas; a housing having a housing inlet in fluid communication with the outlet of the inlet member and having a housing outlet; the housing having an inner cavity in fluid communication with the housing inlet; an electromagnetic solenoid mounted in the inner cavity in the housing and responding to an eject signal from the sorter by generating an electromagnetic force, the solenoid having a central channel through it; a valve seat mounted in the inner cavity of the housing between the solenoid and the housing outlet; a magnetically responsive disc mounted above the valve seat, the disc normally resting on and blocking gas flow through the valve seat in a closed position and the disc moving freely from the valve seat to an open position in response to electromagnetic force from the solenoid permitting pressurized gas to flow through the central channel of the solenoid and to and through the housing outlet. In a further embodiment, the inlet member has a lower chamber formed in it below and enlarged from the inlet. In a further embodiment, the inlet member has multiple passageways extending outwardly from the lower chamber and in communication with the inner cavity of the housing. In one embodiment, the solenoid is mounted beneath the inlet member in the cavity with an annular space around it. In a further embodiment, the passageways in the inlet member are in fluid communication with the annular space. In a further embodiment, the magnetically responsive disc is disposed in a constraining structure of the valve seat and the disc moves uniformly upwardly and away from the valve seat within the constraining structure in response to electromagnetic force from the solenoid. Such structure produces a short, distinct air burst. In a further embodiment, the solenoid is centrally mounted in the housing and air flow to the disc is balanced, contributing to uniformity of disc upward movement. A further embodiment includes a nozzle having an inlet and an outlet located in planes at an angle to each other; the inlet of the nozzle mounted to the outlet of the housing so that when the valve is in the open position, pressurized gas is received in an incoming direction from the housing to the nozzle inlet and the pressurized gas exits the outlet of the nozzle in an outgoing direction at an angle to the incoming direction; preferably, the outgoing direction ranges between about 10 to about 90 degrees from the incoming direction, and most preferably, the outgoing direction is perpendicular to (at 90 degrees to) the incoming direction.

It is therefore, an object of the present invention to provide new, useful, unique, efficient, nonobvious and effective devices for ejecting objects in a product sorter.

Another object of the present invention is the provision of such devices which provide a quick effective air burst for such ejection.

Yet another object of the present invention is the provision of such devices which have a reservoir space within the device that is relatively small.

An additional object of the present invention is to provide such devices having a coil which is cooled by flowing air through the coil.

Another object of the present invention is the provision of such devices in which a disc valve cover moves uniformly away from a valve seat.

To one of skill in this art who has the benefits of this invention's teachings and disclosures, other and further objects and advantages will be clear, as well as others inherent therein, from the following description of presently-preferred embodiments, given for the purpose of disclosure, when taken in conjunction with the accompanying drawings. Although these descriptions are detailed to insure adequacy and aid understanding, this is not intended to prejudice that purpose of a patent which is to claim an invention no matter how others may later disguise it by variations in form or additions of further improvements.

DESCRIPTION OF DRAWINGS

So that the manner in which the above-recited features, advantages and objects of the invention, as well as others which will become clear, are attained and can be understood in detail, more particular description of the invention briefly summarized above may be had by reference to certain embodiments thereof which are illustrated in the appended drawings, which drawings form a part of this specification. It is to be noted, however, that the appended drawings illustrate preferred embodiments of the invention and are therefore not to be considered limiting of its scope, for the invention may admit to other equally effective equivalent embodiments.

DETAILED DESCRIPTION OF PREFERRED EMBODIMENTS

Figure 3:
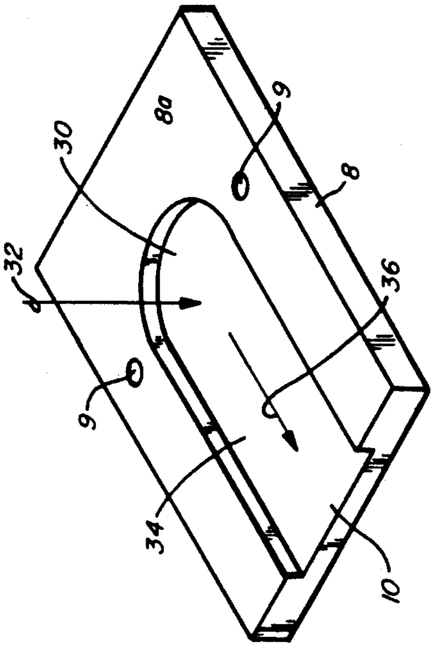
FIG. 3 is an isometric view of a nozzle member of the ejector of FIG. 1.
Figure 1:
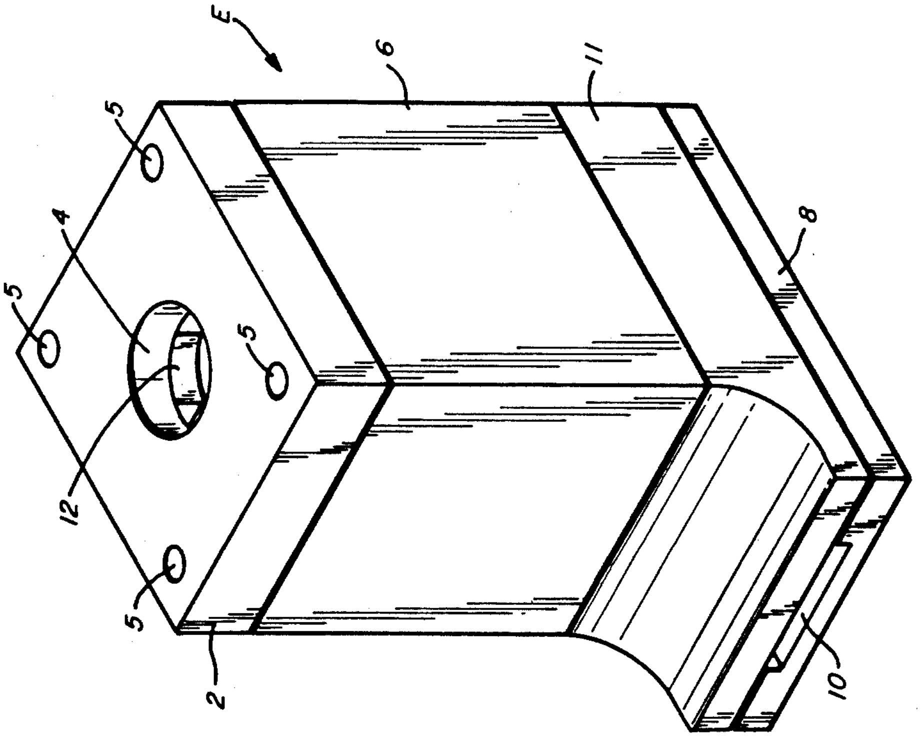
FIG. 1 is an isometric view of an ejector of the present invention.

Referring now to FIG. 1, an ejector apparatus for an object or product sorter according to the present invention, generally referred to by the letter E, is shown. An inlet member 2 with an inlet opening 4 is attached by screws or other suitable fasteners inserted into openings 5 to a housing member 6. The housing member 6 is further attached by screws or other suitable fasteners through holes (not shown) in a lower body member ii and to a nozzle member 8 which has openings 9 (FIG. 3) formed therein for passage of the screws. A generally U-shaped nozzle outlet 10 is formed on upper surface 8*a* of nozzle member 8. The ejector E is provided with pressurized gas, usually air, in the conventional manner, into the inlet hole 4 of the inlet member 2. When the ejector E is activated, or opened, the pressurized gas blows out of the nozzle outlet 10 to divert an object or product from the normal path of descent of the object or product.

Figure 2:
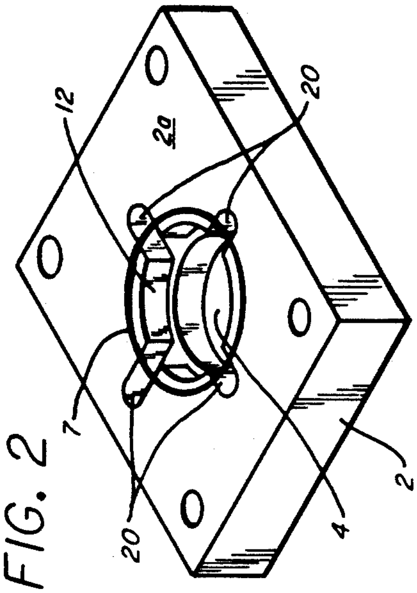
FIG. 2 is an isometric view, inverted in position, of an inlet member of the ejector of FIG. 1.
Figure 5:
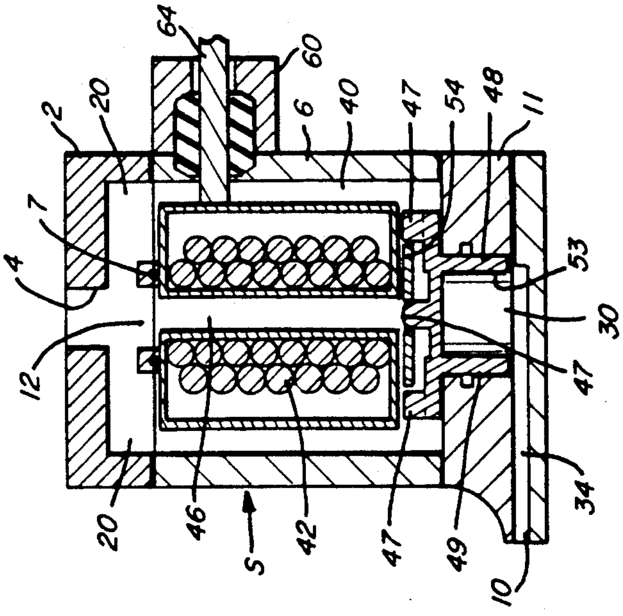
FIG. 5 is a side view, in cross-section, of the ejector of FIG. 1.
Figure 4:
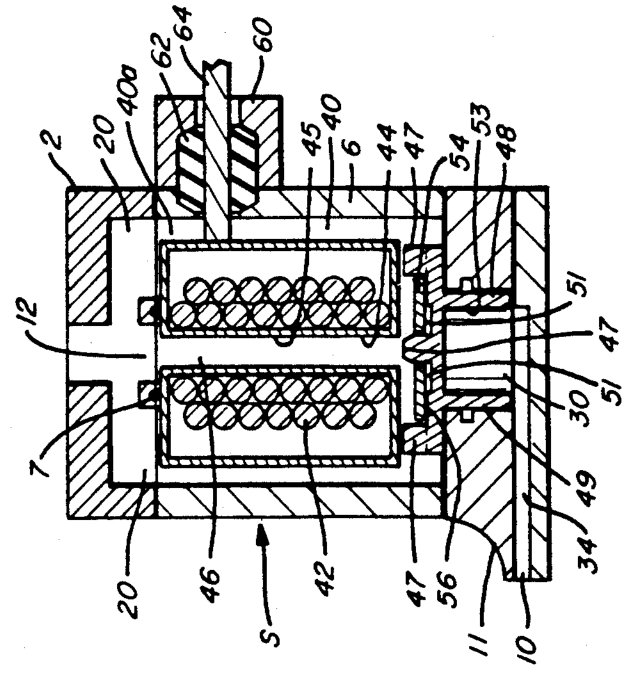
FIG. 4 is a side view, in cross-section, of the ejector of FIG. 1.

The inlet member 2 is more fully illustrated in FIG. 2. The inlet member 2 is shown in FIG. 2 removed from the ejector E and inverted or reversed in position with respect to the view of FIG. 1. The pressurized gas enters the inlet hole 4 and passes into an enlarged lower chamber 12 within inlet member 2. A suitable number, in this instance four, of passageways 20 are formed extending radially outwardly from the chamber 12 in inlet member 2. The multiple passageways 20 facilitate spreading the incoming pressurized gas throughout the housing member 6. An 0-ring seal 7 is disposed between the inlet member 2 and the housing member 6, but does not prevent air flow through the passageways 20. The 0-ring seal 7 is compressible and, when the ejector E is assembled, it applies a force on the solenoid S and shoulders 47 of a valve seat 48 (FIGS. 4 and 5).

Considering now nozzle member 8 (FIG. 3), when the ejector E is activated, or opened, the pressurized gas enters the nozzle member 8 from housing member 6 generally into a rear area 30, formed in nozzle member 8, in a direction shown by an arrow 32. The incoming gas is directed down a nozzle slot 34 formed in nozzle member 8 flowing in a direction shown by an arrow 36, which is a direction that is perpendicular to the flow direction shown by the arrow 32. The gas flowing in the direction of arrow 36 blows out of the nozzle outlet 10 when the ejector E is activated to divert the path of descent of an object or product. Nozzle member 8 and lower body member 11 can be removed from housing member 6 so that various parts (e.g. 47, 48, 51) can be accessed without removing the solenoid S from housing member 6 and/or without disconnecting or disturbing the electrical connections to the solenoids.

Turning to the internal features of the ejector E (FIGS. 4 and 5), the housing member 6 (preferably made from aluminum) has an internal cavity or gas chamber 40 formed in a central position throughout its vertical extent. An upper portion 40a of the chamber 40 is in fluid communication with the passageways 20 of inlet member 2 to receive pressurized gas. Mounted within the chamber 40 is a solenoid S about which the chamber 40 forms an annular space. The solenoid S includes a solenoid coil 42 mounted on a coil support portion 45 in a body 44, which has a hollow center core portion 46. The solenoid coil 42 is cylindrically wound about the coil support portion 45. The solenoid coil 42 is electrically connected to a conventional ejector drive mechanism (not shown) of an object or product sorter. The pressurized gas in lower chamber 12 of the inlet member 2 is in fluid communication with the hollow center core portion 46 of the solenoid body 44.

The coil support 45 is preferably formed of a suitable ferrous material and rests on shoulders 47 of a valve seat 48 which is disposed partially within the chamber 40 and partially within a channel 49 in the body 6.

Mounted between the shoulders 47 for sealing off passageways 51 which communicate with a channel 53 through the valve seat 48 is a magnetically responsive circular disc 54. The disc 54 normally rests (due to its weight and the pressure of compressed gas) upon a seating portion 56 of the valve seat 48 (FIG. 4) thereby preventing flow through the passageways 51, into the channel 53 and thence into the rear area 30 (FIG. 3) of the nozzle member 8.

When, however, the solenoid coil 42 is activated, an electromagnetic force is generated along a vertical longitudinal axis of the solenoid S. The electromagnetic force so generated exerts an upward lifting force, causing the valve disc 54 to move upwardly off of the seating portion 56 (FIG. 5). The air flow passageways are now open, so that pressurized gas can now communicate from the chamber 40 and center core portion 46 around the edges of the valve disc and through the passageways 51, to the channels 53, into the rear area 30 and slot 34 and out from the nozzle member 8.

Figure 6:
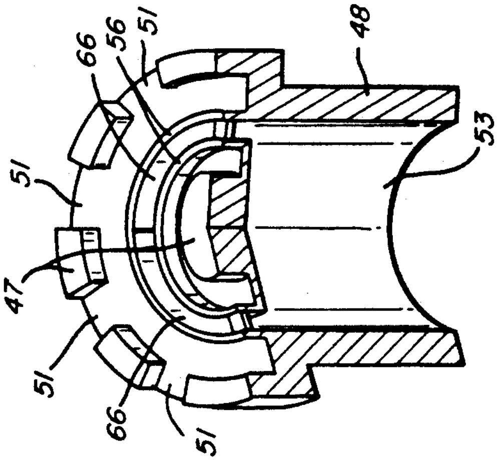
FIG. 6 is a perspective view of a valve seat and valve disc of the ejector of FIG. 4.

FIG. 6 shows the structure of the valve seat 48 as seen from above and illustrates the position of the shoulders 47 and the passageways 51. Air flows through openings 66 in the top of the valve seat 48 and into the channel 53 when the circular disc 54 is raised above the valve seat 48.

In the operation of the present invention, the solenoid coil 42 is activated by receiving electrical current many times in a relatively short time period. Often this generates heat. The hollow center 46 and the chamber 40 allow flowing pressurized gas to pass on both the inside and outside of the solenoid coil 42 providing increased cooling action on the solenoid coil 42.

The rigid valve disc 54 also moves between the open and closed position many times in a given time period (e.g. 800 to 1000 times per second). It is to be noted the valve disc 54 is free to move vertically and it is not fixedly attached to any other portion of the valve. Valve disc 54 can thus freely move between the open position (FIG. 4) and the closed position (FIG. 5). The disc can preferably move uniformly, without tilting, due to the even balanced air flow to and around it. Thus, relatively less time is required to eject an object. Since the valve disc 54 is not required to bend or flex in opening and closing, there is no substantial likelihood of fatigue and attendant failure due to repeated flexure or bending. Since it moves uniformly upward and downward the valve disc 54 is also less susceptible to wear as compared to discs in prior art devices that move nonuniformly. Pressurized gas flows through the chamber 40 and the hollow center 46 and blows out of the nozzle outlet 10 in a direction which preferably ranges between about 90 degrees and about 10 degrees with respect to a vertical axis of the channel 53 to minimize disc-to-nozzle distance and which most preferably is perpendicular to (90 degrees) the channel 53.

An aluminum member 60 secured to the housing member 6 (e.g. by bolts, not shown) compresses and holds a grommet 62 in a gas tight relationship with the housing member 60. A power line 64 extends from an exterior power source (not shown) in a gas tight manner through the member 60 to the solenoid S.

Having described the invention above, various modifications of the techniques, procedures, material and equipment will be apparent to those in the art. It is intended that all such variations within the scope and spirit of the appended claims be embraced thereby.

I claim:

1. A valve apparatus for an ejector for an object sorter, comprising
- an inlet member having an inlet to receive pressurized gas and an outlet for transfer of the gas,
- a housing having a housing inlet in fluid communication with said outlet of said inlet member and having a housing outlet from which gas flows out of the valve apparatus,
- said housing having an inner cavity in fluid communication with said housing inlet,
- an electromagnetic solenoid mounted in said inner cavity in said housing and responding to an eject signal from the sorter by generating an electromagnetic force, said solenoid having a central channel therethrough,
- a valve seat having a seating portion and being mounted in said inner cavity of said housing between said solenoid and said housing outlet,
- a nozzle having an inlet and an outlet located in planes at an angle to each other,
- a magnetically responsive disc mounted above said valve seat and being not fixedly attached to other portions of the valve,
- said disc normally resting on said seating portion of said valve seat and blocking gas flow through said valve seat in a closed position,
- said disc moving freely off said valve seat to an open position in response to electromagnetic force from said solenoid, permitting pressurized gas to flow through said solenoid central channel and said valve seat to and through said housing outlet
- said inlet of said nozzle being mounted to said housing outlet such that when said disc is in said open position, pressurized gas is received in an incoming direction from said housing to said nozzle inlet and such pressurized gas exits said outlet of said nozzle in an outgoing direction at an angle to the incoming direction.

2. The apparatus of claim 1, wherein
- said inlet member has a lower chamber formed therein below and enlarged from said inlet.

3. The apparatus of claim 2, wherein said inlet member has multiple passageways formed therein extending outwardly from said lower chamber and in communication with said inner cavity of said housing.

4. The apparatus of claim 3, wherein said solenoid is mounted beneath said inlet member in said cavity with an annular space thereabout.

5. The apparatus of claim 4, wherein said passageways in said inlet member are in fluid communication with said annular space.

6. The apparatus of claim 1, wherein said magnetically responsive disc is disposed in a costraining structure of said valve seat and said disc moves uniformly upwardly and away from said valve seat within said constraining structure in response to electromagnetic force from said solenoid.

7. The apparatus of claim 6 wherein said solenoid is centrally mounted in said housing and air flow to said disc is balanced contributing to uniformity of disc upward movement.

8. The apparatus of claim 1 wherein the outgoing direction ranges between about 10 to about 90 degrees from the incoming direction.

9. The apparatus of claim 8 wherein the outgoing direction is perpendicular to the incoming direction.

10. The valve apparatus of claim 1 wherein the housing outlet is in a bottom housing member removably secured to the housing, removal of the bottom housing member permitting access to and removal of the valve seat and disc from the housing without removal of the solenoid from the housing.

11. A valve apparatus for an ejector for an object sorter, comprising an inlet member having an inlet to receive pressurized gas and an outlet for transfer of the gas, said inlet member having a lower chamber formed therein below and enlarged from said inlet, the inlet member having multiple passageways formed therein extending outwardly from said lower chamber and in communication with said inner cavity of said housing, a housing having a housing inlet in fluid communication with said outlet of said inlet member and having a housing outlet from which gas flows out of the valve apparatus, said housing having an inner cavity in fluid communication with said housing inlet, an electromagnetic solenoid mounted in said inner cavity in said housing and responding to an eject signal from the sorter by generating an electromagnetic force, said solenoid having a central channel there through, said solenoid mounted beneath said inlet member in said cavity with an annular space thereabout, said passageways in said inlet member in fluid communication with said annular space, said solenoid centrally mounted in said housing, a valve seat mounted in said inner cavity of said housing between said solenoid and said housing outlet, a magnetically responsive disc mounted above said valve seat and disposed in a constraining structure of said valve seat, said disc moving uniformly upwardly and away from said valve seat within said constraining structure in response to electromagnetic force from said solenoid, air flow to said disc balanced contributing to uniformity of disc upward movement, said disc normally resting on and blocking gas flow through said valve seat in a closed position, said disc moving freely off said valve seat in response to electromagnetic force from said solenoid, permitting pressurized gas to flow through said central channel of said solenoid and to and through said housing outlet, a nozzle having an inlet and an outlet located in planes at an angle to each other, and said inlet of said nozzle being mounted to said housing outlet such that when said valve apparatus is in said open position, pressurized gas is received in an incoming direction from said housing to said nozzle inlet and such pressurized gas exits said outlet of said nozzle in an outgoing direction at an angle to the incoming direction, the outgoing direction ranging between about 10 to about 90 degrees from the incoming direction.

12. The valve apparatus of claim 11 wherein the housing outlet is in a bottom housing member removably secured to the housing, removal of the bottom housing member permitting access to and removal of the valve seat and disc from the housing without removal of the solenoid from the housing.

* * * * *